Patented Jan. 6, 1931

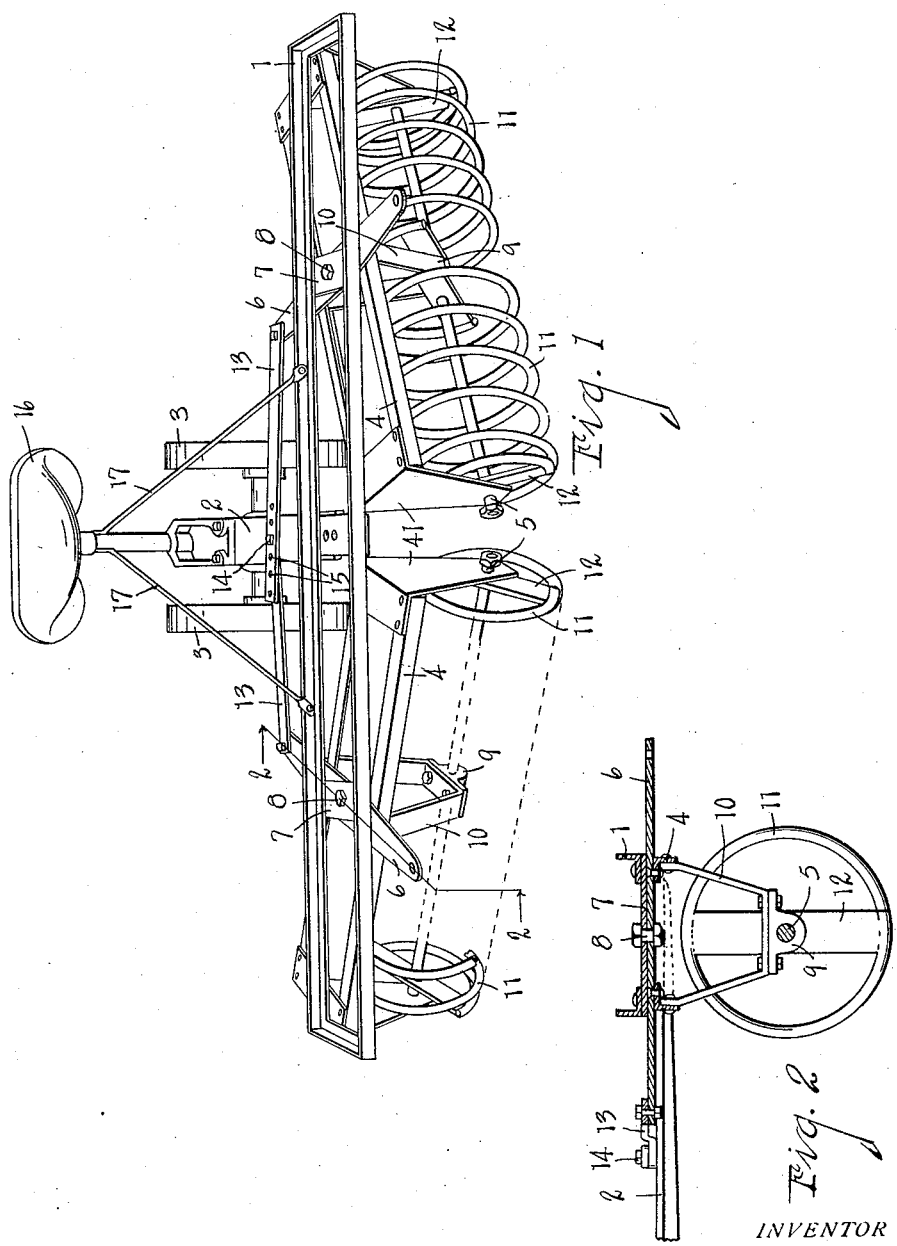

1,788,165

UNITED STATES PATENT OFFICE

ANTHONY LIENHART, OF STOCKBRIDGE, MICHIGAN

AGRICULTURAL MACHINE

Application filed November 29, 1929. Serial No. 410,283.

The present invention relates to agricultural machines of the weeder type; that is, machines especially designed for use in shallow cultivation or destroying young growths of weeds in growing crops, the crops being cultivated without injury thereto. The particular structure is an adaptation of and in some respects an improvement upon the structure shown in the application of Charles Malepsy filed April 27, 1929, Serial No. 358,714, finally allowed June 17, 1929, said application having been assigned to the applicant.

The main object of this invention is to provide a machine of the character described which is readily adjusted to meet varying conditions.

A further object is to provide a machine of this character which is simple and economical in its parts and very efficient.

Objects relating to details and economies of my invention will appear from the description to follow. The invention is defined and pointed out in the claims.

A structure which is a preferred embodiment of my invention is illustrated in the accompanying drawing, in which:

Fig. 1 is a rear perspective view of my improved agricultural implement or machine, parts being shown conventionally.

Fig. 2 is a fragmentary sectional view on line 2—2 of Fig. 1.

Referring to the drawing, the main frame 1 is preferably rectangular and formed of angle iron with the channels facing upwardly providing a holder in which receptacles containing rocks or weights may be placed if desired for weighting the machine.

This frame is provided with a central drawbar 2 having carrying wheels 3 at the front end thereof. The auxiliary or soil working unit frames 4 are provided with hangers 41 at the ends thereof for the shafts 5.

Cross arms 6 are secured to these auxiliary frames to project at each side thereof. These cross arms are pivoted to the cross pieces 7 of the main frame by means of the pivots or king bolts 8 so that the auxiliary frames swing on central pivots in a horizontal plane.

The shafts are further supported by means of the central bearings 9 carried by the hangers 10.

The blades 11 are spirally coiled and are of round cross section, the ends of the coils being secured in radial supports 12 fixed to or rotating upon the shafts as may be desired. The coils of the blades are of substantially uniform pitch and diameter, the pitch of the blades of the two working units being in opposite directions.

The working units are held in proper relation to each other; that is, they may be adjusted at an angle to each other as shown in Fig. 1 and supported in adjusted position by means of the links 13 which are pivoted to the arms 6 and adjustably connected by means of the bolts 14 and a plurality of openings 15 in the links to the drawbar.

A seat 16 is mounted upon the drawbar, struts 17 for the seat being connected to the main frame.

With the parts thus arranged, the working units may be adjusted to the desired angular relation, the machine is effectively balanced, that is, there is no tendency for the machine to creep sidewise, and the angle may be adjusted as desired. Further, the units are interchangeable so that the pitch of the blades may be either in or out as desired.

The implement is especially desirable as a weeder as it is designed to pass over young plants which are firmly rooted but will destroy the weeds as it moves the entire surface of the ground with a scuffing or sliding movement, passing over the young plants, however, without injury thereto. The structure also has the advantage of loosening the surface and leaving it in a smooth, finely worked condition.

Having thus described my invention, what I claim as new and desire to secure by Letters Patent, is:

1. In a structure of the class described, the combination of a main frame provided with a forwardly-projecting centrally-disposed drawbar having carrying wheels at its front end, soil working unit frames provided with hangers at their ends, shafts on said hangers, centrally-disposed bearings for said shafts, cross arms on said soil working unit frames pivotally mounted on said main frame to project at both sides thereof, links adjustably connecting the front ends of said cross arms to said drawbar, and spirally coiled blades of substantially uniform pitch and diameter mounted on said shafts with their pitch in opposite directions.

2. In a structure of the class described, the combination of a main frame provided with a forwardly-projecting centrally-disposed drawbar having carrying wheels at its front end, soil working unit frames, shafts on said unit frames, arms on said soil working unit frames pivotally mounted on said main frame, links adjustably connecting the front ends of said arms to said drawbar, and spirally coiled blades of substantially uniform pitch and diameter mounted on said shafts with their pitch in opposite directions.

3. In a structure of the class described, the combination of a main frame, soil working unit frames provided with shaft hangers, shafts on said hangers, said frames being pivotally mounted at a central point on said main frame for independent adjustment in a horizontal plane, forwardly projecting arms on said unit frames, links adjustably connecting the front ends of said arms to said main frame, and spirally coiled blades of round cross section and substantially uniform pitch and diameter mounted on said shafts with their lead in opposite directions.

4. In a structure of the class described, the combination of a main frame, soil working unit frames provided with shaft hangers, shafts on said hangers, said frames being pivotally mounted at a central point on said main frame for independent adjustment in a horizontal plane, and spirally coiled blades of round cross section and substantially uniform pitch and diameter mounted on said shafts with their lead in opposite directions.

5. In a structure of the class described, the combination of a main frame, soil working unit frames mounted below said main frame for pivotal adjustment, the pivots being disposed centrally of said unit frames, means for adjustably supporting said unit frames in their adjusted positions relative to each other, and spirally coiled blades of round cross section rotatably mounted on said unit frames with their pitch in opposite directions.

In witness whereof I have hereunto set my hand.

ANTHONY LIENHART.